G. M. TEW.
DEVICE FOR BLOWING OUT OIL PIPES.
APPLICATION FILED JAN. 17, 1918.
1,290,408.
Patented Jan. 7, 1919.
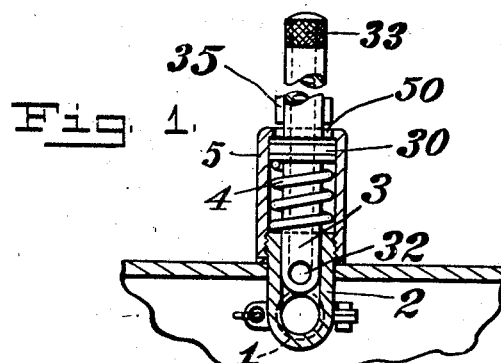
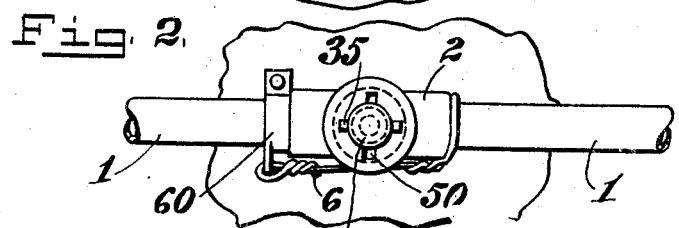
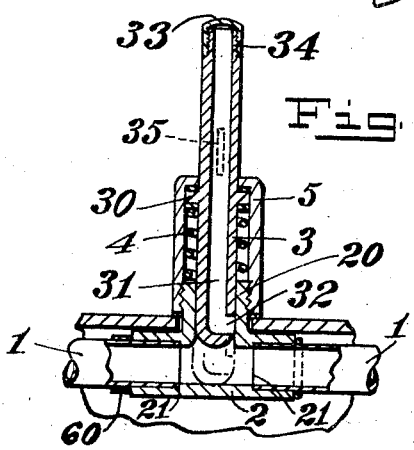
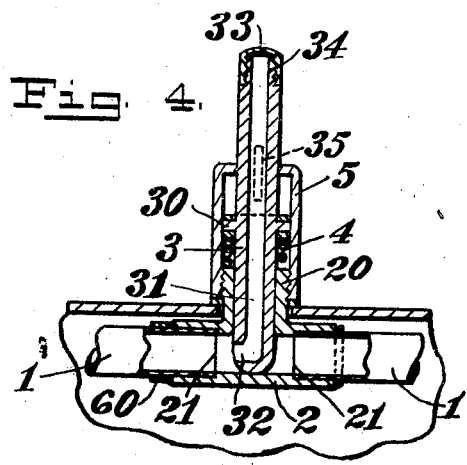
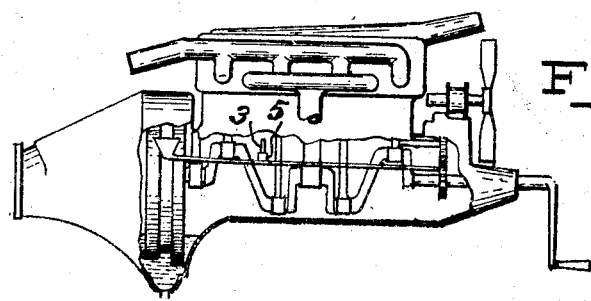
Inventor
George M. Tew
By Henry L. Reynolds
Attorney

UNITED STATES PATENT OFFICE.

GEORGE M. TEW, OF KIRKLAND, WASHINGTON.

DEVICE FOR BLOWING OUT OIL-PIPES.

1,290,408.      Specification of Letters Patent.      Patented Jan. 7, 1919.

Application filed January 17, 1918. Serial No. 212,379.

*To all whom it may concern:*

Be it known that I, GEORGE M. TEW, a citizen of the United States, and resident of Kirkland, county of King, and State of Washington, have invented certain new and useful Improvements in Devices for Blowing Out Oil-Pipes, of which the following is a specification.

My invention consists of a device which may be applied to pipes which are used for conveying oils or other liquids, which pipes might become clogged, either from the oil becoming thick and viscous or by the deposit therein of foreign matter, by the use of which device air may be applied to blow out the pipes and clean them of any foreign matter which may have become lodged therein.

The object of my invention is to provide a simple, cheap and convenient means for attachment to pipes such as mentioned, whereby they may be quickly and thoroughly cleaned out and to enable this to be done so conveniently and easily that it will be done often.

The principles involved in my invention and a preferred construction of means for carrying it out have been illustrated in the accompanying drawing and will be hereinafter described and the particular parts and combinations of parts which constitute my invention will be defined in the claims appended to this specification.

Figure 1 is a section of my device taken lengthwise of the air supplying nozzle and in a plane extending across the pipe to which the device is attached.

Fig. 2 is an exterior view taken in line with the air supplying nozzle.

Figs. 3 and 4 are sections taken in the plane of the pipe and showing the nozzle in different positions.

Fig. 5 is a view of an engine of the type widely employed to drive automobiles showing the manner of applying my invention thereto.

In the oiling system of a popular car, a pipe 1 is employed for conveying oil collected by a funnel or apron upon which it is thrown by a moving part of the machinery, to parts of the machinery which require liberal oiling. The pipe 1 represents such a pipe or any other pipe, which is used as a means for conveying oil or other liquid from one point to another.

At a convenient point in such a pipe it is cut and my device is inserted, the same making it possible to apply air under pressure to blow out the pipe and to be able to cause this air to act in one direction only, whereby the pressure of the air may be effectively utilized to dislodge and remove all matter lodged in the pipe.

The device which is applied to the pipe has a T-shaped casing or body resembling a pipe T. The ends of the head of such casing are constructed to receive the ends of the pipe where it has been cut, this head end forming a part of the through channel of the pipe.

Where the thickness of the pipe 1 will permit, the connection may be by threaded joints, but in the particular make of car referred to the walls of the pipe are too thin for this and their ends are therefore simply a tight fit within the casing 1. I prefer, in either case, to recess the casing, as shown at 21, so that the conduit surface through the casing is smooth and without shoulders.

The stem 20, of the casing, is bored and has therein a plunger 3 which fits snugly but may be easily reciprocated therein. A spring 4 bearing against the outer end face of the stem 20 and a collar 30 on the plunger 3, normally holds the plunger outward, or so that its inner end does not extend into or block the through passage in the head of the T 2. Conveniently, a cap 5, is screwed upon the stem 20 and forms a guide for the outer end of the plunger 3, as well as retaining it in place.

The plunger 3 has a central or axial bore 31 which has a side discharge opening 32 at its inner end. This member thus forms an air discharging nozzle which may be placed in free communication with the pipe 1 by pushing it inward. It is evident that the supply of air to the pipe may be limited to one end only, this end being determined by that toward which the opening 32 faces. It may be freely turned to face in any direction.

To insure accurate facing when pressed inward I may provide the head of the cap 5 with notches 50, and the plunger 3 with a short rib 35, which is adapted to enter either of these notches and remain in engagement therewith while depressed. The inner end of this rib should be without the head of cap 5 when the plunger is in outward position.

The outer end of the plunger or air supplying nozzle 3 is threaded, as shown at 34, this being preferably of the same size and threads as the tire nipples, so that the same attachment as is used to connect an air pump or air supply hose with the tire may be used to connect with the plunger or nozzle 3. A protective cap 33 should ordinarily cover this end.

I have shown a wire 6 as passing about one part of the pipe 1 and secured to a clamp ring 60 which is secured to the other part. This or other means may be employed to prevent separation of the pipe sections.

In using my device the cap 34 is removed, the air hose applied to the nozzle or plunger 3 and it is pushed inward. It cannot be pushed inward except when the rib 35 enters one of the notches 50, in which position the discharge opening 32 is facing toward one end of the pipe. When the air is turned on, it will clear this end of the pipe. By drawing the nozzle outward, turning it half way around and then pressing it in, the other end of the pipe may be blown out.

What I claim as my invention is:

1. The combination with an oil feed pipe of a hollow T fitting adapted to be connected in said pipe between its ends, a hollow plug fitting the stem of said T and adapted when pushed inward to close the oil flow channel, said plug normally being held out of the oil-flow channel and having a side discharge adapted to register with said oil flow channel when the plug is pushed in.

2. A means for blowing out pipes comprising a casing having a tubular T adapted to have its head inserted in said pipe and a plug mounted to reciprocate in the stem of the T, and having an axial bore with a lateral discharge adapted to register with the pipe when the plug is pushed inward, a spring normally holding the plug withdrawn, said plug being turnable to discharge toward either part of the connected pipe.

3. A means for blowing out pipes comprising a T coupling adapted to have its head inserted in the pipe, a stem mounted to turn and reciprocate in the stem of the coupling and to close the passage through the head when pushed thereinto, said stem having a bore extending from its outer end and a discharge port at one side in a position to communicate with the head when pushed inward, means for normally withdrawing said stem to thereby close said discharge port, said stem being at its outer end adapted for connection thereto of an air supply pipe, said stem and the stem of the coupling being provided with members engageable when the stem is pushed inward to prevent rotation and to insure registration of its discharge port with the passage in the head.

4. A means for blowing out pipes comprising a T shaped coupling adapted to have its head inserted in the pipe to form a part of the flow channel thereof, a cap securable on the stem, a nozzle in the form of a plunger fitting in the stem of the coupling and having a bore extending from its outer end to a side discharge port near its inner end in position to register with the passages of the head when the plunger is pushed inward, a spring surrounding said plunger and engaging the stem of the coupling, the plunger having a collar engaging the outer end of the spring, a cap inclosing said spring and secured to the coupling, the head of this cap being notched and the plunger having a rib normally without the cap and reciprocable within the notches in the cap to insure registration of the air discharge port with the passages in the head.

Signed at Seattle, Washington, this 2nd day of January, 1918.

GEORGE M. TEW.